United States Patent [19]
Dewald, Jr. et al.

[11] Patent Number: 5,577,351
[45] Date of Patent: Nov. 26, 1996

[54] SLIDE OUT ROOM WITH FLUSH FLOOR

[76] Inventors: James E. Dewald, Jr.; Martin P. McManus; Patrick W. McManus, all of 1023 W. Eighth St., P.O. Box 703, Mishawaka, India. 46544

[21] Appl. No.: 396,113

[22] Filed: Feb. 28, 1995

[51] Int. Cl.⁶ ..................................................... E04B 1/344
[52] U.S. Cl. ................... 52/67; 52/71; 52/126.1; 296/171
[58] Field of Search ...................... 52/67, 64, 69, 52/71, 126.1, 126.5; 296/171, 175, 26, 170, 165

[56] References Cited

U.S. PATENT DOCUMENTS

| | | | |
|---|---|---|---|
| 2,820,666 | 1/1958 | Grochmal | 296/171 |
| 3,106,750 | 10/1963 | Jarman | 52/67 X |
| 3,719,386 | 3/1973 | Puckett et al. | 52/67 X |
| 4,955,661 | 9/1990 | Mattice | 296/171 |
| 5,419,933 | 2/1996 | Miller et al. | 52/67 |

*Primary Examiner*—Kien T. Nguyen
*Attorney, Agent, or Firm*—Baker & Daniels

[57] ABSTRACT

Mobile living quarters, such as that provided by a recreational vehicle, is equipped with a slide out room which is retractable into the main living area when the unit is moved and is extended from the main living area to provide auxiliary living space when the unit is used. The slide out room is prodded with a floor that slides along the main floor of the unit and then drops to a position flush with the main floor of the unit as the room is moved into the extended position. A camming linkage controls movement of the floor relative to the walls of the slide out unit to move the floor between the sliding and flush positions.

15 Claims, 4 Drawing Sheets

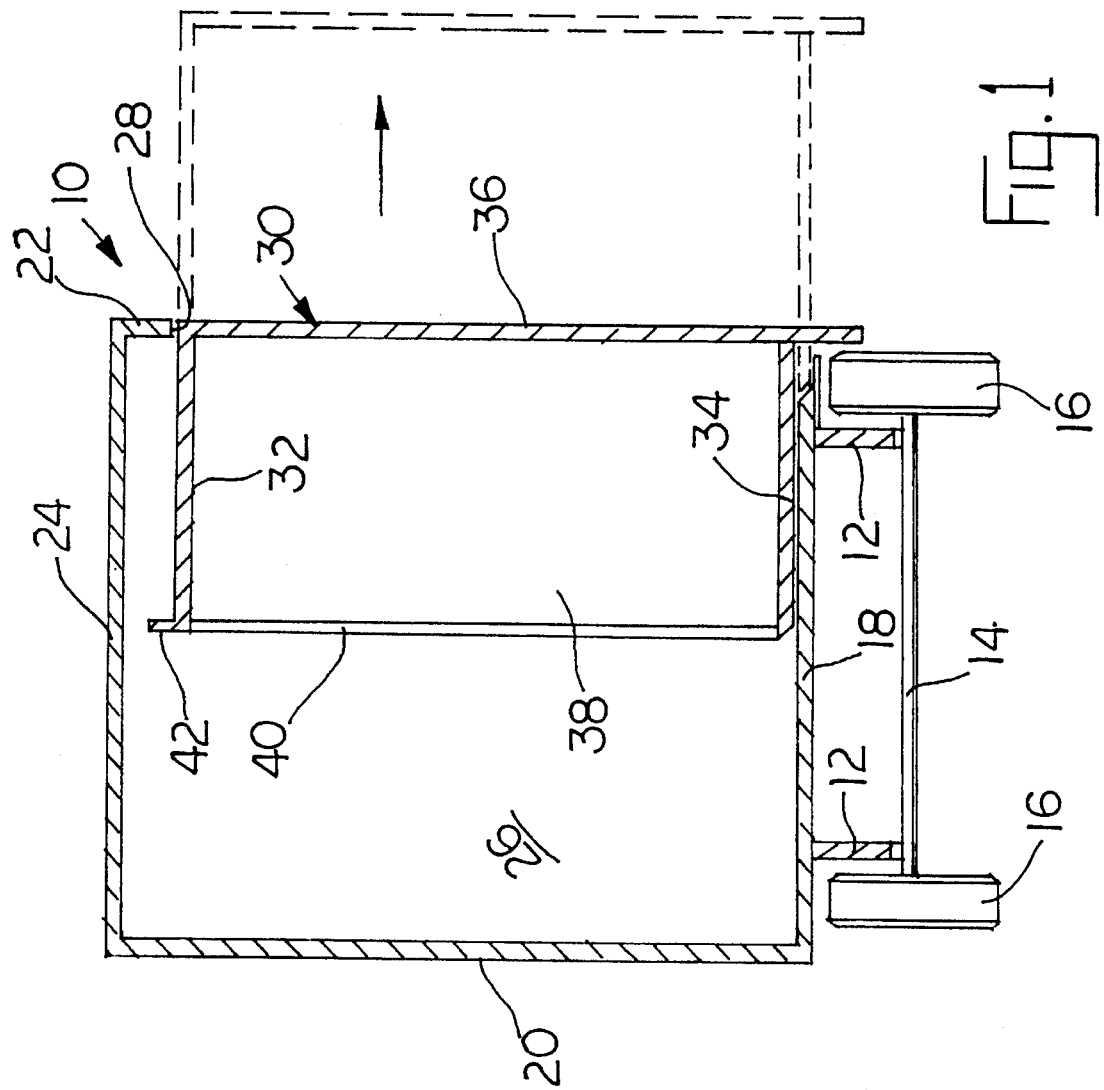

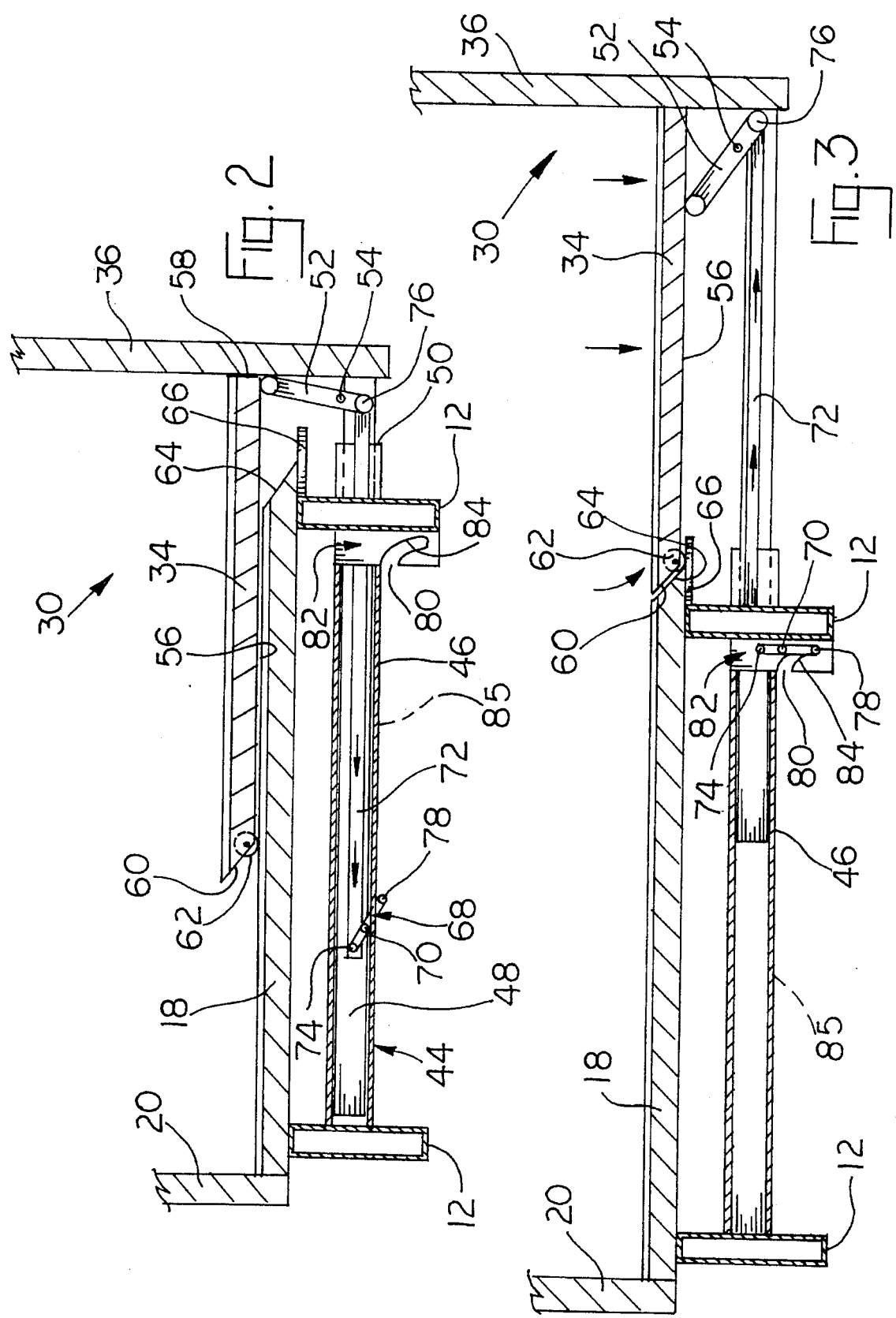

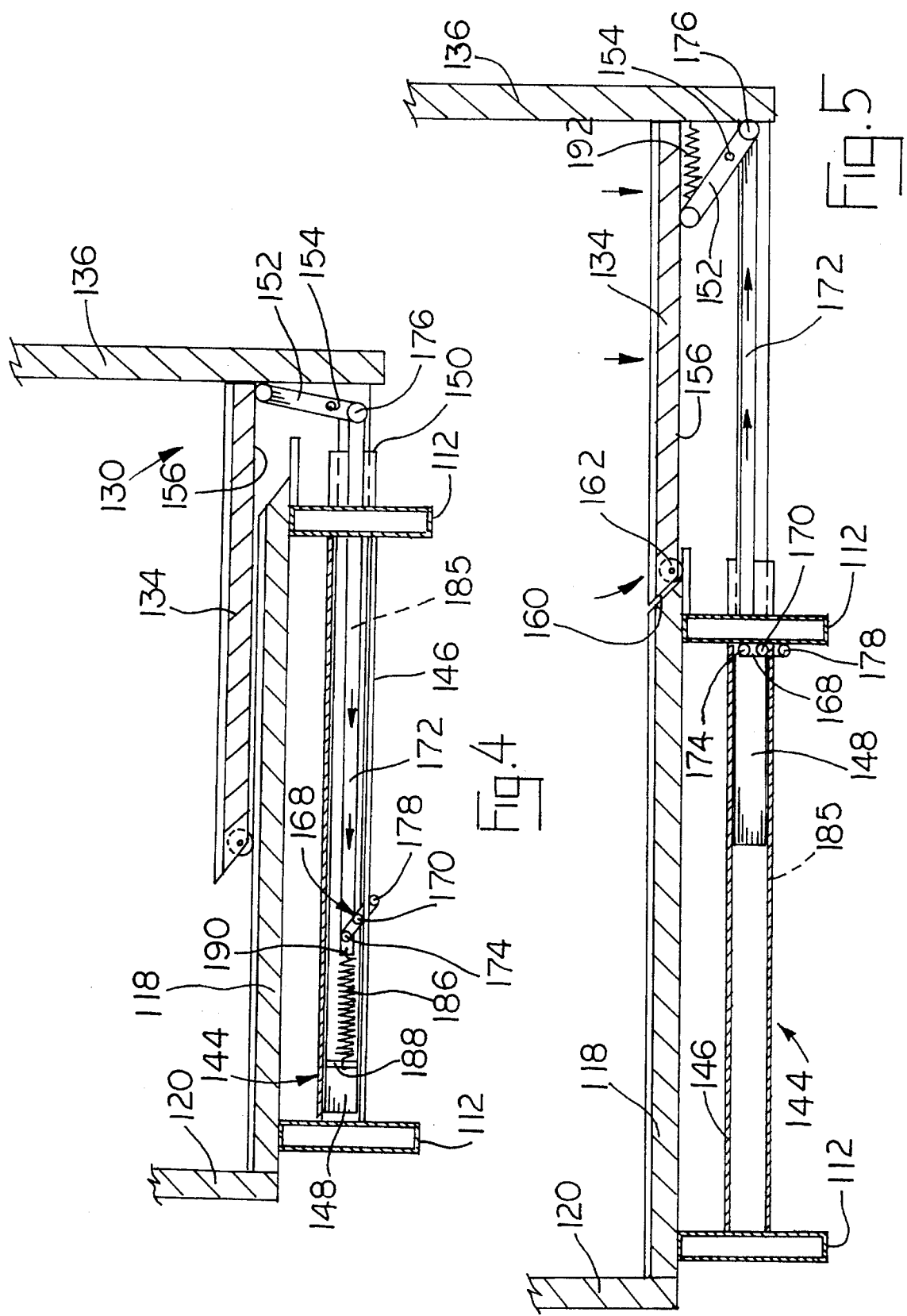

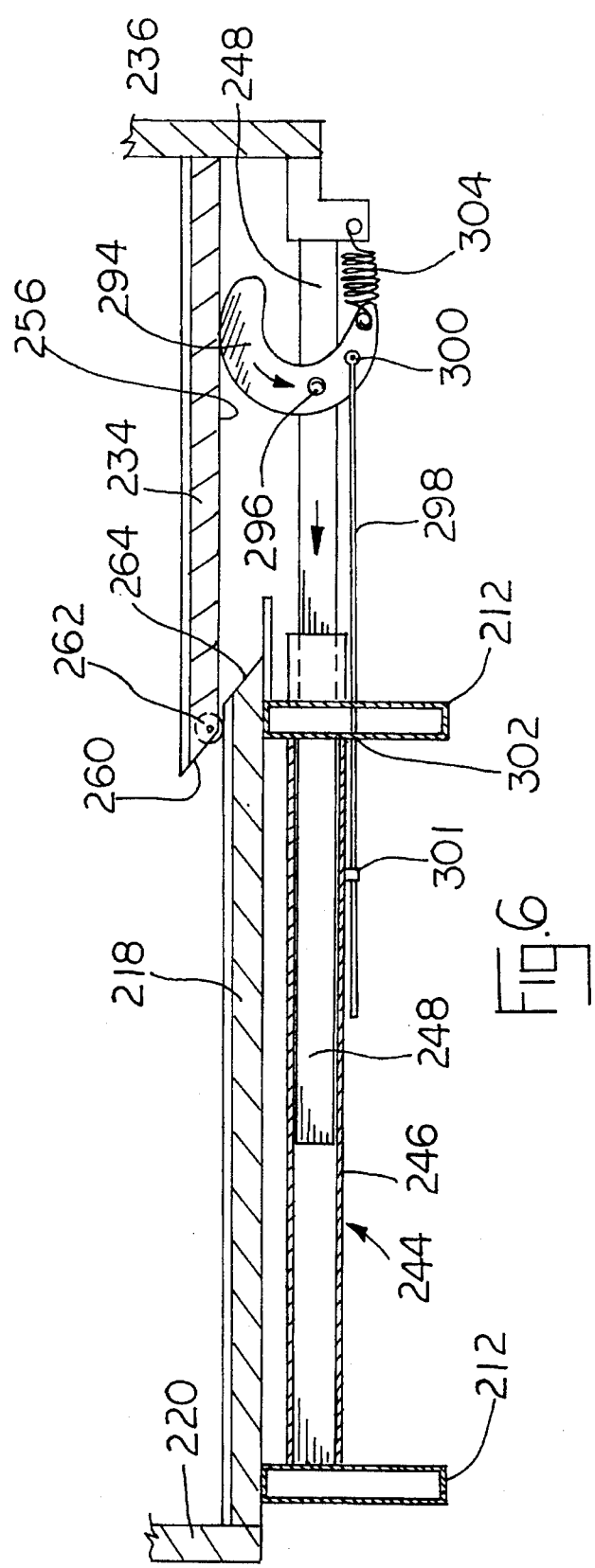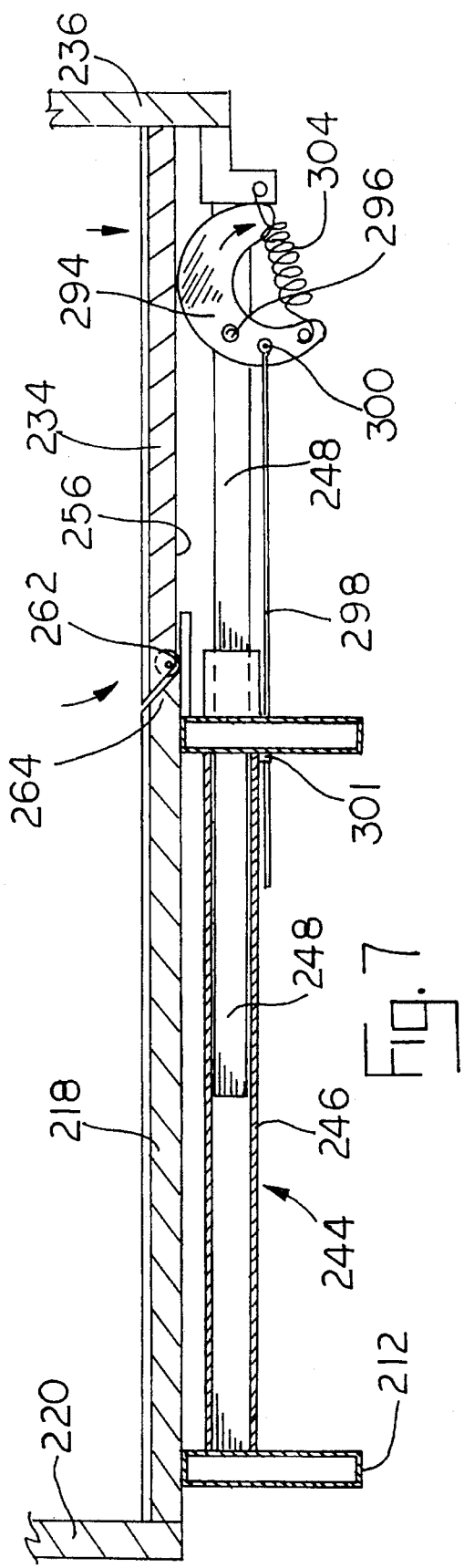

SLIDE OUT ROOM WITH FLUSH FLOOR

This invention relates to a retractable room for recreational vehicle or manufactured housing which has a floor that is moved into a position flush with the floor of the main living area when the retractable room is extended.

The width of recreational vehicles and manufactured housing, is limited to that which can be accommodated for travel on public roads. Accordingly, it is common to provide recreational vehicles and manufactured housing with a slide out room which can be retracted into the main living quarters when the mobile living quarters is moved, but which can be extended from the main living quarters to provide auxiliary living space when the mobile living quarters is parked for use. Since the retractable room must be retracted into the main living area, the floor of the retractable room must slide on the floor of the main living area when the retractable room is retracted. Accordingly, the level of the floor of the retractable room must be offset from the main floor when the retractable room is retracted. On the other hand, when the retractable room is extended to provide auxiliary living quarters the difference in level between the floor of the retractable or slide out room and the main floor is obviously extremely inconvenient. One way to level out the floors is to drop the entire retractable room to a level in which the level of the floor of the retractable or slide out room is flush with the main floor. However, by dropping the entire slide out room, head room is further reduced over that required to permit retraction of the slide out room.

The present invention provides a slide out or retractable room for mobile living quarters such as recreational vehicles and manufactured housing in which the floor of the slide out room moves relative to the walls and ceiling of the slide out room as the slide out room is moved into its extended position. The floor moves from a higher sliding position to permit the floor to slide along the main floor of the unit as the extendable or slide out room is extended or retracted, but the floor of the retractable room moves vertically relative to the walls of the room into a position flush with the main floor as the slide out room is moved into the extended position. As the room is retracted away from the extended position, the floor of the retractable room is moved upwardly relative to the main floor so that the floor of the retractable room can slide upon the main floor as the retractable room is retracted into the main living quarters. Accordingly, the desirable flush floor is provided, but the headroom in the retractable room is maintained, because the floor of the retractable room moves relative to the walls of the retractable room.

These and other advantages of the present invention will become apparent from the following description, with reference to the accompanying drawings, in which:

FIG. 1 is a cross sectional view of the mobile living quarters incorporating a retractable or slide out room; the room being shown in solid lines in its retracted position and in dashed lines in its extended position;

FIG. 2 is a fragmentary transverse cross sectional view taken through the floor, frame, and lower wall portions of the mobile living quarters illustrated in FIG. 1 with the retractable room being illustrated in its retracted position;

FIG. 3 is a view similar to FIG. 2, but illustrating the retractable room in its extended position;

FIG. 4 is a view similar to FIG. 2, but illustrating an alternate embodiment of the invention;

FIG. 5 is a view similar to FIG. 3, but illustrating still another alternate embodiment of the invention;

FIG. 6 is a view of still another embodiment of the invention taken in section through the lower portion of the walls, floor and the frame of the mobile living quarters illustrated in FIG. 1, but illustrating the relative position between the floor of the retractable room and the main floor just before the retractable room begins to move into the extended position; and FIG. 7 is a view similar to FIG. 6 but illustrating the relative positions of the various components after the retractable room has been moved into the extended position.

Referring now to the drawings, mobile living quarters generally indicated by the numeral 10 includes a frame 12 supported by an axle 14 and wheels 16. A main floor 18 is supported by the frame 12, and side walls 20, 22 and ceiling 24 cooperate with floor 18 to define a main living quarters 26. An opening 28 is formed in the side wall 22 for receiving a slide out or retractable room generally indicated by the numeral 30. The retractable or slide out room 30 includes a ceiling 32, a floor 34, which will be described in detail hereinafter, an outer wall 36, and side walls 38. Side walls 38, floor 34, and ceiling 32 define an open end 40 such that when the slide out or retractable room 30 is moved into the extended position illustrated by the dotted lines in FIG. 1, access is provided between the main living quarters and the auxiliary living quarters provided by the slide out room 30. A lip 42 carried on the ceiling 32 and side walls 38 of the slide out or retractable room 30 extends at least part of the way around the opening 40 and is adapted to sealingly engage the portion of side wall 22 circumscribing the opening 28.

Referring now to FIGS. 2 and 3, a retractable or slide out room 30 is supported on the frame 12 by extensible members generally indicated by the numeral 44. Although only one set of extensible members 44 are illustrated, it will be understood that at least two, and possibly additional sets of extensible members 44 will be necessary to support the room 30 for movement relative to the unit 10. Extensible members 44 include an outer tube or channel member 46 which is secured to frame 12 and inner tube 48 which is slideably received within, and supported by, the outer tube 46. The inner tube 48 extends from end 50 of the tube 46 and is secured to the wall 36 of retractable room 30 to support and guide the latter for movement relative to the frame 12. A lever 52 is pivotally mounted on inner tube 48 at a pivot point 54 and projects upwardly therefrom (viewing FIG. 2) to engage lower surface 56 of floor 34 adjacent the end 58 thereof that is unattached but engages the wall 36. The opposite end of floor 34 terminates in a tapered portion 60 which is supported for movement relative to floor 18 by a roller 62. Main floor 18 terminates in a tapering section 64, and a lip 66 extends from frame 12 past the end of the tapering section 64 to receive roller 62 as the floor 34 moves into the position illustrated in FIG. 3, as will hereinafter be described. A toggle 68 is also pivotally mounted on inner tube 48 by a pivot 70 for movement with the inner tube 48 and for pivotable movement relative thereto. A link 72 interconnects the toggle 68 with the lever 52, and is pivotably mounted to the toggle 68 at pivot 74 and is pivotably secured to lever 52 by a pivot 76. End portion 78 of toggle 68 is adapted to receive in a slot 80 and a camming plate 82 is secured to the frame 12. The slot 80 includes a downwardly curving portion 84. The distance between end 78 of the toggle 68 and downwardly curving portion 84 of slot 80 is equal to the distance that the floor 34 moves as the room 30 is moved between its fully retracted and fully extended positions. The tube or channel member 46 is provided with a longitudinally extending slot 85 through which toggle 68 extends.

In operation, the slidably retractable room 30 is illustrated in FIG. 2 in the position which it assumes when the room is fully retracted. In this condition, the floor 34 of the retractable room slides across the main floor 18 and is supported in the raised position illustrated in FIG. 2 by the roller 62 and by the lever 52. When the room 30 is to be extended, room 30 is moved to the right viewing the figures by use of, for example, hydraulic rams (not shown) or other appropriate power devices, so that the inner tube 48 slides along the outer tube 46. As this occurs, the lever 52, link 72 and toggle 68 do not pivot relative to the inner tube 48, but are moved therewith, so that the lever 52 may support the end 58 of the floor 34 in the sliding position illustrated. As the roller 62 reaches the ramp 64 and begins to move down the ramp, the end 78 of toggle 68 enters the curved portion 84 of the slot 80. As this occurs, further outward movement of the inner tube 48 moves the link 72 relative to the inner tube 48 since the end 78 of toggle 68 is prevented from further outward movement by its engagement with the slot 80. Accordingly, further outward movement of the inner tube 48 pivots the toggle 68 relative to inner tube 48 about the pivot 70. Pivoting of the toggle 68 is transmitted to the lever 52 through the link 72, thereby pivoting the lever 52 about the pivot 54 in a counterclockwise direction until the lever 52 is rotated into the position illustrated in FIG. 3 and the toggle 68 is substantially vertical.

As the lever 52 rotates into the position illustrated in FIG. 3, end 58 of the floor 34 is gradually dropped at substantially the same rate as the roller 62 rides down the ramp 64. Accordingly, when the apparatus is in the FIG. 3 position, the roller 62 is supported on the lip 66 and the lever 52 is rotated downwardly as illustrated so that both ends 60 and 58 of the sliding floor 34 are supported at substantially the same level. It will be noted that, as the room 30 is extended, the floor 34 first moves slidably on the floor 18, and then moves downwardly into the flush position illustrated in FIG. 3. The walls 36 are supported on inner tube 48 and do not move vertically when the floor 34 moves relative to the walls 36 and the main floor 18 to move into the flush position. Accordingly, head room within the extendable or slide out room 30 is maintained, and no discontinuity in the floor is present.

When it is desired to retract room 30 into the main living quarters, the aforementioned hydraulic rams or other devices (not shown) are actuated to urge the inner tube 48 to the left in FIGS. 2 and 3. As this occurs, toggle 68 is pivoted about pivot 70 in the counter clockwise direction, since end 78 of toggle 68 is restrained against movement to the left in viewing FIG. 3 by curved portion 84 of the camming slot 80. Accordingly, counter clockwise pivoting of the toggle 68 urges link 72 to the left in viewing FIGS. 2 and 3, thereby rotating lever 52 about pivot 54 in a clockwise direction. Accordingly, the floor 34 will first be lifted by the lever 52 and by the action of roller 62 riding up the ramp 64 until the inner tube 48 has moved relative to tube 46 a distance sufficient to withdraw end 78 from the camming slot 80. Accordingly, the lever 52 is rotated back into position illustrated in FIG. 2, and lever 52, link 72, and toggle 68 travel with the inner tube 48 upon further retraction of the latter to bring the room 30 back into the retracted position illustrated in FIG. 2.

Referring now to the embodiment of FIG. 4, elements the same or substantially the same as those in the embodiment of FIGS. 1–3 retain the same reference numeral, but increased by 100. In the embodiment of FIG. 4, the camming plate 82 is replaced by a spring 186 which is secured to inner tube 48 as at 188. The opposite end of spring 186 is secured at 190 to the link 172. Upon extension of the room 130, link 172 moves with inner tube 148 to the right viewing FIG. 4, until the end 178 of toggle 168 engages the frame 112. Engagement of end 178 with frame 112 prevents further movement of end 178 to the right viewing FIG. 4, so that further outward movement of the inner tube 148 relative to the tube 146 is transmitted through the link 172 that pivots the toggle 168, thereby bringing the latter to a vertical position and simultaneously lowering the lever 152 into the FIG. 3 position. When the room 130 is thereafter retracted, the inner tube 148 moves to the left viewing the figures, thereby moving the toggle 168 away from the frame member 112. Accordingly, the spring 186 urges the link 172 to the left viewing FIG. 4, thereby pivoting the toggle 168 into the position illustrated in FIG. 4. Accordingly, the lever 152 is pivoted into the raised position where it supports the end of 158 of movable floor 134 in the position illustrated in FIG. 4.

Referring now to the embodiment of FIG. 5, elements the same or substantially the same as those in the embodiment of FIG. 4, retain the same reference number. In FIG. 5, the spring 186 is replaced with a spring 192 connected between the wall 136 and the lever 152. Upon movement of the toggle 168 into engagement with the frame 112 as indicated in FIG. 5 during outward movement of the room 130, the lever 152 is rotated counterclockwise thereby lowering the floor 134 and extending the spring 192. Upon retraction of the room 130, movement of the toggle 168 away from the frame member 112 causes the spring 192 to rotate the lever 152 back into the upward position illustrated in FIGS. 2 and 4. Rotation of the lever 152 urges the floor 134 upwardly into the sliding position in which the floor 134 slides along the floor 118.

Referring now to the alternate embodiment of FIGS. 6 and 7, elements the same or substantially the same as those in the embodiment of FIGS. 1–3 retain the same reference characters, but increased by 200. The device illustrated in FIGS. 6 and 7 is similar to the device illustrated in FIGS. 1–3, except that the camming plates, toggle member, link and lever are replaced by a curved cam 294 which is pivotably mounted at 296 to the inner tube 248. An actuating stem 298 is pivotally connected to the camming member 294 at 300 and extends through frame member 212. A stop member 301 is secured to stem 298 and is adapted to engage engagement surface 302 on the frame member 212. Accordingly, the camming member 294 extends with the inner tube 248 until the stop member 301 engages engagement surface 302. When this occurs, further outward movement of the inner tube 248 pivots the camming member 294 in a clockwise direction into the position illustrated at FIG. 7. As the camming member 294 pivots, a spring 304 connected between the wall 236 and the camming member 294 extends, and simultaneously the floor 234 is gradually lowered into the FIG. 7 position. Upon retraction of the room 230 and resulting movement of the stop member 301 away from the stop surface 302, the spring 304 rotates the camming member 294 in the counterclockwise direction, thereby raising the floor 234 as the roller 262 rides up the ramp 264. Additional movement of the inner tube 248 to the left slides the floor 234 across the floor 218 until the room 230 is fully retracted.

We claim:

1. Mobile living quarters comprising a frame, a main floor supported by said frame, means extending from said main floor to define with said main floor a main living area, a retractable room mounted for movement from a retracted position retracted into the main living area to an extended position extended from said main living area to provide an auxiliary living area, said retractable room having walls and a movable floor unattached to the walls of the retractable room and movable along said main floor with the walls of the retractable room and then movable relative to said walls of the retractable room from a sliding position sliding upon said main floor to a flush position substantially flush with said main floor when the retractable room is in the extended position, and linkage means mounted on said frame and engaging said movable floor for moving the latter relative to said walls of the retractable room from said sliding position to said flush position as said retractable room is moved into the extended position and from said flush position to said sliding position as the retractable room is moved away from the extended position.

2. Mobile living quarters as claimed in claim 1, wherein said retractable room moves horizontally between said extended and retracted positions and said movable floor moves vertically relative to the walls into said flush position as the retractable room approaches the extended position.

3. Mobile living quarters as claimed in claim 2, wherein said linkage means includes movable floor actuating means for causing the movable floor to move from said sliding position to said flush position as said retractable room approaches the extended position.

4. Mobile living quarters as claimed in claim 1, wherein said linkage means includes retractable room support means mounted on said frame and engaging said retractable room to guide the latter for movement relative to said frame.

5. Mobile living quarters as claimed in claim 1, wherein said linkage means includes retractable room support means mounted on said frame and engaging said retractable room to guide the latter for movement relative to said frame, a member carried by said support means for moving said movable floor between said sliding and said flush positions, and a link connected to said member for operating the latter, said link being responsive to movement of said retractable room into the extended position to move said member in a direction causing the movable floor to move into the flush position and responsive to movement of the retractable room away from the extended position to move said member in a direction causing the movable floor to move into the sliding position.

6. Mobile living quarters comprising a frame, a main floor supported by said frame, means extending from said main floor to define with said main floor a main living area, a retractable room mounted for movement from a retracted position retracted into the main living area to an extended position extended from said main living area to provide an auxiliary living area, said retractable room having walls and a movable floor movable along said main floor with the walls of the retractable room and then movable relative to said walls of the retractable room from a sliding position sliding upon said main floor to a flush position substantially flush with said main floor when the retractable room is in the extended position, and linkage means mounted on said frame and engaging said movable floor for moving the latter relative to said walls of the retractable room from said sliding position to said flush position as said retractable room is moved into the extended position and from said flush position to said sliding position as the retractable room is moved away from the extended position, said linkage means including retractable room support means mounted on said frame and engaging said retractable room to guide the latter for movement relative to said frame, said retractable room support means including a pair of relatively slidable members, one of said members being mounted on said frame and supporting the other member for movement with said retractable room between said extended and retracted positions, said linkage means including an actuating linkage pivotally mounted on said other member and engaging said movable floor for moving said floor between said sliding position and said flush position.

7. Mobile living quarters comprising a frame, a main floor supported by said frame, means extending from said main floor to define with said main floor a main living area, a retractable room mounted for movement from a retracted position retracted into the main living area to an extended position extended from said main living area to provide an auxiliary living area, said retractable room having walls and a movable floor movable along said main floor with the walls of the retractable room and then movable relative to said walls of the retractable room from a sliding position sliding upon said main floor to a flush position substantially flush with said main floor when the retractable room is in the extended position, and linkage means mounted on said frame and engaging said movable floor for moving the latter relative to said walls of the retractable room from said sliding position to said flush position as said retractable room is moved into the extended position and from said flush position to said sliding position as the retractable room is moved away from the extended position, said retractable room moving horizontally between said extended and retracted positions and said movable floor moving vertically relative to the walls of the retractable room into said flush position as the retractable room approaches the extended position, said linkage means including movable floor actuating means for causing the movable floor to move from said sliding position to said flush position as said retractable room approaches the extended position, said linkage means including an arm pivotally mounted with respect to said frame and extending therefrom to support said movable floor, said arm being pivotal from a first position supporting said movable floor in said sliding position to a second position moving said floor into said flush position.

8. Mobile living quarters as claimed in claim 7, wherein said linkage means includes a lever pivotally mounted with respect to said frame and a link connecting said lever to said arm whereby pivoting of the link pivots said arm between said first and second positions, and pivoting means for pivoting said lever to move said arm between said first and second positions.

9. Mobile living quarters as claimed in claim 8, wherein said pivoting means includes a camming plate carried by said frame, said lever engaging a slot in said camming plate to pivot said lever from said first to said second position upon movement of said other member toward said extended position and from said second position to said first position upon movement of the other member away from said extended position.

10. Mobile living quarters as claimed in claim 7, wherein said linkage means includes a spring pivoting said lever from one of said first and second positions to the other position.

11. Mobile living quarters as claimed in claim 7, wherein said linkage means includes a link extending from said lever and stop means carried by said link for engaging a stop surface carried by said frame for pivoting said lever from one of said first and second positions to the other position.

12. Mobile living quarters as claimed in claim 11, wherein said linkage means includes a spring yieldably urging said lever from the other position to the one position.

13. Mobile living quarters as claimed in claim 7, wherein said linkage means includes means responsive to movement of said retractable room into said extended position to pivot said lever from said first position to said second position, and a spring for returning said lever from said second position to said first position as said retractable room is moved away from said extended position toward said retracted position.

14. Mobile living quarters as claimed in claim 7, wherein said linkage means includes a camming link connected to said lever for moving the latter between said positions and a camming plate having a slot engaging said camming link for moving the latter in one direction in response to movement of said retractable room into said extended position and in the opposite direction in response to movement of said retractable room away from said extended position.

15. Mobile living quarters comprising a frame, a main floor supported by said frame, means extending from said main floor to define with said main floor a main living area, a retractable room mounted for movement from a retracted position retracted into the main living area to an extended position extended from said main living area to provide an auxiliary living area, said retractable room having walls and a movable floor movable along said main floor with the walls of the retractable room and then movable relative to said walls of the retractable room from a sliding position sliding upon said main floor to a flush position substantially flush with said main floor when the retractable room is in the extended position, and linkage means mounted on said frame and engaging said movable floor for moving the latter relative to said walls of the retractable room from said sliding position to said flush position as said retractable room is moved into the extended position and from said flush position to said sliding position as the retractable room is moved away from the extended position, said linkage means including means for maintaining said movable floor substantially parallel to said main floor as the movable floor is moved between the flush and sliding positions.

* * * * *